US012596638B2

(12) United States Patent
Chen et al.

(10) Patent No.: US 12,596,638 B2
(45) Date of Patent: Apr. 7, 2026

(54) SYSTEMS AND METHODS FOR SELECTING TEST COMBINATIONS OF HARDWARE AND SOFTWARE FEATURES FOR FEATURE VALIDATION

(71) Applicant: Microsoft Technology Licensing, LLC, Redmond, WA (US)

(72) Inventors: Yingying Chen, Redmond, WA (US); James Lee Wooldridge, Redmond, WA (US); Amitabh Nag, Redmond, WA (US); Josh C. Moore, Redmond, WA (US); Praveen Kuma Arjunan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 425 days.

(21) Appl. No.: 18/309,570

(22) Filed: Apr. 28, 2023

(65) Prior Publication Data

US 2024/0220402 A1     Jul. 4, 2024

Related U.S. Application Data

(60) Provisional application No. 63/436,409, filed on Dec. 30, 2022.

(51) Int. Cl.
G06F 11/3668 (2025.01)

(52) U.S. Cl.
CPC ................................ G06F 11/3688 (2013.01)

(58) Field of Classification Search
CPC ........................................... G06F 11/36–3698
See application file for complete search history.

(56) References Cited

U.S. PATENT DOCUMENTS

| | | | | |
|---|---|---|---|---|
| 11,775,878 B2 * | 10/2023 | Gao | ..................... | G06F 11/3688 |
| | | | | 706/12 |
| 2014/0040867 A1 | 2/2014 | Wefers et al. | | |
| 2019/0317885 A1 * | 10/2019 | Heinecke | ............ | G06F 11/3698 |

(Continued)

OTHER PUBLICATIONS

Weedmark, D., "What is Reinforcement Learning and How is it Used?", Domino Data Lab, Inc. [online], 2021 [retrieved Aug. 22, 2025], Retrieved from Internet: <URL: https://domino.ai/blog/what-is-reinforcement-learning>, whole document.*

(Continued)

*Primary Examiner* — Todd Aguilera

(57) ABSTRACT

Examples of the present disclosure describe systems and methods for selecting test combinations of hardware and software features for product validation. In examples, a test scheduler of a system receives metrics associated with a first batch of test combinations for multiple computing entities. The metrics may include data associated with a fleet prevalence and a fleet risk determined for the multiple computing entities. The scheduler provides one or more of the metrics to a machine learning algorithm. The test scheduler determines a second batch of test combinations associated with a subset of the multiple computing entities based on an output of the machine learning algorithm. The second batch of combinations may include a subset of the first batch of test combinations. The system executes the second batch of test combinations for the subset of the multiple computing entities.

20 Claims, 6 Drawing Sheets

(56) References Cited

U.S. PATENT DOCUMENTS

| | | |
|---|---|---|
| 2020/0097388 A1 | 3/2020 | Bhat et al. |
| 2021/0303450 A1 | 9/2021 | Bhat et al. |
| 2022/0100647 A1 | 3/2022 | Hamid |
| 2022/0198340 A1* | 6/2022 | Gao .................... G06F 11/3688 |

OTHER PUBLICATIONS

Romdhana, et al., "IFRIT: Focused Testing Through Deep Reinforcement Learning", In Proceedings of IEEE Conference on Software Testing, Verification and Validation, Jun. 8, 2022, pp. 24-34.

* cited by examiner

FIG. 4

| | Generation | VM Family | AN Enabled | RDMA Enabled | Fast SSD |
|---|---|---|---|---|---|
| | 401 → | 402 → | 403 → | 404 → | 405 → |
| 306a → | 6.0 | standardDv3Family | False | False | False |
| 306b → | 7.1 | standardDSv3Family | False | True | False |
| 306c → | 4.1 | standardDSv3Family | False | True | False |
| 306d → | 5.7 | standardDv3Family | False | False | False |
| 306e → | 6.0 | standardDSv3Family | False | True | False |
| 306f → | 4.1 | standardDSv3Family | False | False | False |
| 306g → | 5.8 | standardDv3Family | False | False | False |

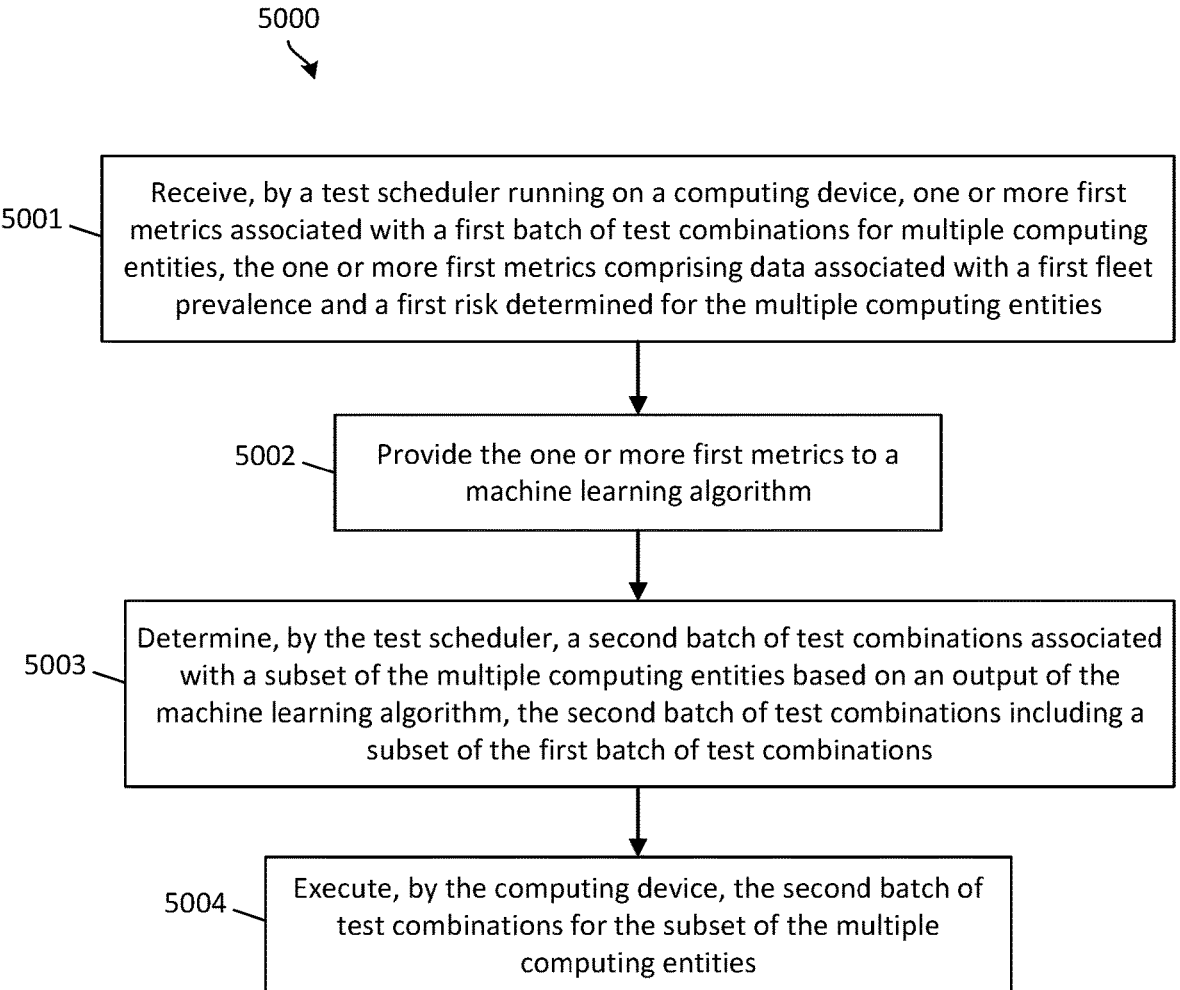

5000

5001 — Receive, by a test scheduler running on a computing device, one or more first metrics associated with a first batch of test combinations for multiple computing entities, the one or more first metrics comprising data associated with a first fleet prevalence and a first risk determined for the multiple computing entities 5002 — Provide the one or more first metrics to a machine learning algorithm 5003 — Determine, by the test scheduler, a second batch of test combinations associated with a subset of the multiple computing entities based on an output of the machine learning algorithm, the second batch of test combinations including a subset of the first batch of test combinations 5004 — Execute, by the computing device, the second batch of test combinations for the subset of the multiple computing entities

SYSTEMS AND METHODS FOR SELECTING TEST COMBINATIONS OF HARDWARE AND SOFTWARE FEATURES FOR FEATURE VALIDATION

CROSS-REFERENCE TO RELATED APPLICATIONS

This application claims the benefit of U.S. Provisional Application No. 63/436,409 filed Dec. 30, 2022, entitled "Systems and Method for Selecting Test Combinations of Hardware and Software Features for Feature Validation," which is incorporated here in by reference in its entirety.

BACKGROUND

New products are typically validated before being deployed to users by executing various performance tests on the products. In many cases, a group of products that are the same or similar in type are configured with different hardware and/or software options. Due to the variance in the configurations of the products, numerous performance tests of various types must be created and executed to test the products. Executing performance tests on each product configuration is often costly and an inefficient use of a product testing budget.

It is with respect to these and other general considerations that the aspects disclosed herein have been made. Also, although relatively specific problems are discussed, it should be understood that the examples should not be limited to solving the specific problems identified in the background or elsewhere in this disclosure.

SUMMARY

Examples of the present disclosure describe systems and methods for selecting test combinations of hardware and software features for product validation. In examples, a test scheduler of a system receives metrics associated with a fleet of computing entities, and with a first batch of test combinations for multiple computing entities in the fleet. In some embodiments, the metrics include data associated with a fleet prevalence and a risk determined for the multiple computing entities. In cases where the computing entities have not already been deployed in a production environment, risk is estimated using risk metrics calculated from tests conducted on computing entities (e.g., similar computing entities) that have been deployed. The test scheduler provides the metrics to a machine learning algorithm to determine an impact of features of the multiple computing entities on the performance of the multiple computing entities. The machine learning algorithm employs techniques, such as reinforcement learning, to optimize a second batch of test combinations for a subset of the multiple computing entities. The test scheduler determines the second batch of test combinations based on an output of the machine learning algorithm. The second batch of combinations may include a subset of the first batch of test combinations. In some embodiments, the second batch of test combinations is based on the fleet prevalence and the risk calculated from prior tests (e.g., the estimated risk from tests). The system executes the second batch of test combinations for the subset of the multiple computing entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description, which follows, and, in part, will be apparent from the description, or may be learned by practice of the disclosure.

BRIEF DESCRIPTION OF THE DRAWINGS

Examples are described with reference to the following figures.

FIG. 4 illustrates an example batch of combinations depicted in table format with each row defining one test combination for a group of nodes.

FIG. 5 illustrates an example method for selecting test combinations for product validation.

DETAILED DESCRIPTION

Figure 1:
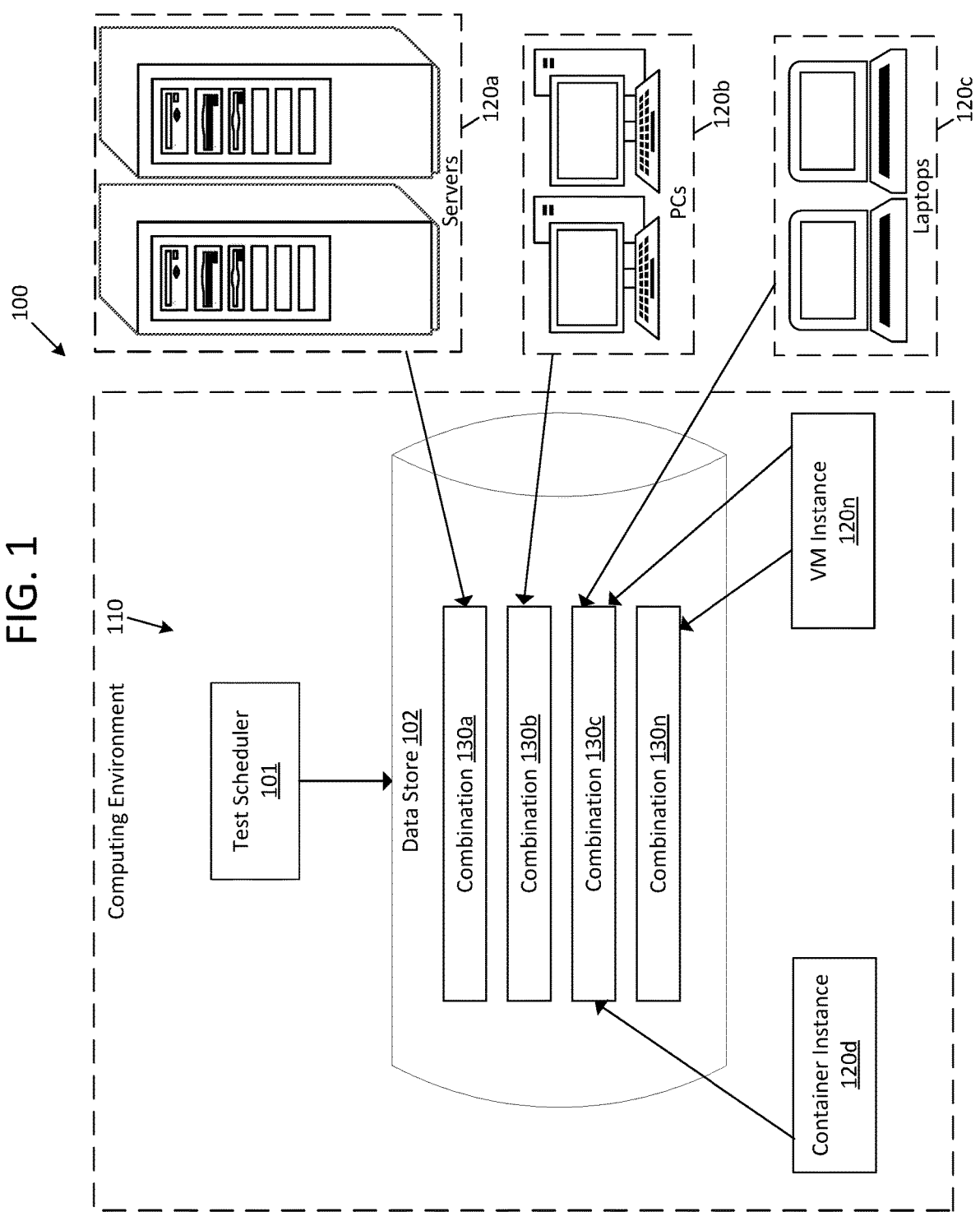
FIG. 1 illustrates an overview of an example system for selecting test combinations of hardware and software features for product validation with respect to multiple computing entities.

A test scheduler is used to validate features of computing entities before they are deployed for use. A test scheduler, as used herein, refers to a system, device, service, or software component configured to assist with and/or to perform feature validation for computing entities. A computing entity, as used herein, refers to a component of a computing infrastructure, such as a node, a virtual machine (VM), or a container. In some embodiments, a test scheduler includes or has access to one or more combinations associated with the computing entities. A combination, as used herein, refers to a set of features (e.g., hardware and/or software features) that defines a group of computing entities having similar attributes. Examples of features include, hardware model, software version, computing resources (e.g., CPU, memory, bandwidth, disk storage), configuration setting (e.g., computing entity size, networking options, data storage options, user access options, security options, and usage options).

A fleet of computing entities includes multiple computing entities. Each computing entity of the fleet of computing entities has a specific combination, which may be different from combinations for other computing entities in the fleet. It is advantageous to test the computing entities, before being deployed (e.g., to an end user, a service provider, etc.), to identify the potential of the computing entities to fail (e.g., to become unresponsive or experience degraded performance) and to address the causes (or potential causes) of the failures. However, as the number of different combinations within a fleet increases, testing every combination becomes impractical or impossible under certain constraints. In some situations, there is a limited amount of time or a limited number of resources available for testing a fleet of computing entities. Furthermore, testing every combination consumes computing resources (e.g., central processing unit (CPU), memory, or bandwidth) on computers used to test the combinations, which causes the computers to perform less efficiently than if the computers tested fewer combinations.

In many cases, some combinations will be more prevalent in a fleet than other combinations, and some combinations will have a higher probability of failure than other combinations. Accordingly, testing all combinations or fewer combinations at random often results in wasting computing resources on testing combinations that have a low fleet prevalence (e.g., are not frequently used) and/or that have a low probability of failure. Fleet prevalence, as used herein, refers to a measure based on an amount of usage of a particular combination within a fleet of computing entities. In some examples, the fleet prevalence is further based on a value associated with the particular combination. In one example, fleet prevalence is an amount of usage of a particular combination. In some embodiments, fleet prevalence indicates the population (e.g., a percentage or a number) of each type of combination configured for a fleet of computing entities. Additionally or alternatively, fleet prevalence indicates information associated with a relative usage of each combination within a fleet. For example, fleet prevalence indicates which combinations are being used the most over time. Accordingly, randomly testing combinations does not provide satisfactory insights regarding the actual behavior of each specific combination when the combination is in use (e.g., deployed).

Embodiments of the present disclosure address the challenges of the above-described implementation approaches and describe systems and methods for selecting test combinations of hardware and software features for product validation. A test combination, as used herein, refers to a combination of hardware and software features that is tested to determine the actual or expected performance of the combination when deployed to computing entities. For example, a given test combination enables a test scheduler to group computing entities together for testing based on specific features shared by each computing entity. In examples, a test scheduler component of a computing device receives metrics associated with a fleet of computing entities and a first batch of test combinations for multiple computing entities in the fleet. The first batch may include test combinations having overlapping features that are to be tested together. For example, a first test combination of the first batch may have one or more features that are the same as one or more of the features of a second test combination of the first batch. In some embodiments, the metrics, received by the test scheduler, include data associated with a fleet prevalence and a risk determined for the multiple computing entities. Risk, as used herein, refers to a percentage or a number of computing entities and/or combinations that have experienced or are expected to experience reliability issues (e.g., connectivity outages or disruption, performance degradation, unexpected resource usage). Accordingly, fleet risk refers to a percentage or number of computing entities and/or combinations in a fleet that have experienced or are expected to experience reliability issues after being deployed for use. An estimated risk from tests refers to a percentage or a number of computing entities and/or combinations that are expected to experience reliability issues, which has been estimated based on metrics calculated from tests conducted on similar computing entities that have been deployed (e.g., computing entities that have similar attributes to the computing entities being tested).

In examples, risk is based on events perceived by a testing device or service (e.g., via real-time monitoring mechanisms or event logs) and/or events reported by users of the computing entities. In cases where the computing entities have not already been deployed (e.g., in a production environment or in a test environment), risk is not available during testing. In such cases, risk may be estimated using risk metrics calculated from tests conducted on similar computing entities that have been deployed. The test scheduler provides the metrics to a machine learning (ML) algorithm configured for reinforcement learning to determine an impact of features of the multiple computing entities on the performance of the multiple computing entities. The test scheduler then determines a second batch of test combinations for a subset of the multiple computing entities based on an output of the ML algorithm. In some embodiments, the second batch of test combinations is determined based on the fleet prevalence and the fleet risk calculated from prior testing of combinations. In cases where there is no prior test data, an initial set (e.g., a randomly selected set) of test combinations is used as the first batch without the benefit of referencing prior test data. In some embodiments, the probability of selecting a particular initial set of test combinations is proportional to the fleet prevalence of that particular set of test combinations. The second batch of test combinations may include a subset of the first batch of test combinations, wherein the subset is selected based on referencing test data from the first batch. In other words, some test combinations from the first batch may be considered worthwhile for future testing (e.g., combinations having a relatively high risk or a relatively high prevalence), while other test combinations from the first batch may not be considered worthwhile for future testing (e.g., combinations having a relatively low risk or a relatively low prevalence). For example, in some embodiments, the second batch of test combinations is selected, by the test scheduler, for testing based on prioritizing a different prevalence and/or a different risk than a prevalence or risk associated with the first batch of test combinations. Accordingly, the test scheduler utilizes artificial intelligence (e.g., reinforcement learning) to enable the computing device to use resources (e.g., computing resources) more efficiently on test combinations of interest by prioritizing the testing of test combinations that are more prevalent and/or more likely to experience reliability issues.

Thus, the present disclosure provides a plurality of technical benefits and improvements over previous feature validation solutions. These technical benefits and improvements include: (i) the ability to optimize a test scheduler to prioritize feature combinations that have a high prevalence and a high probability of failure; (ii) the ability to measure the effectiveness of the test scheduler; and (iii) the ability to more effectively utilize the resources (e.g., computing resources) allocated to a computing device, such that the computing device is able to operate more efficiently while performing feature validation more effectively, among other examples.

Figure 6:
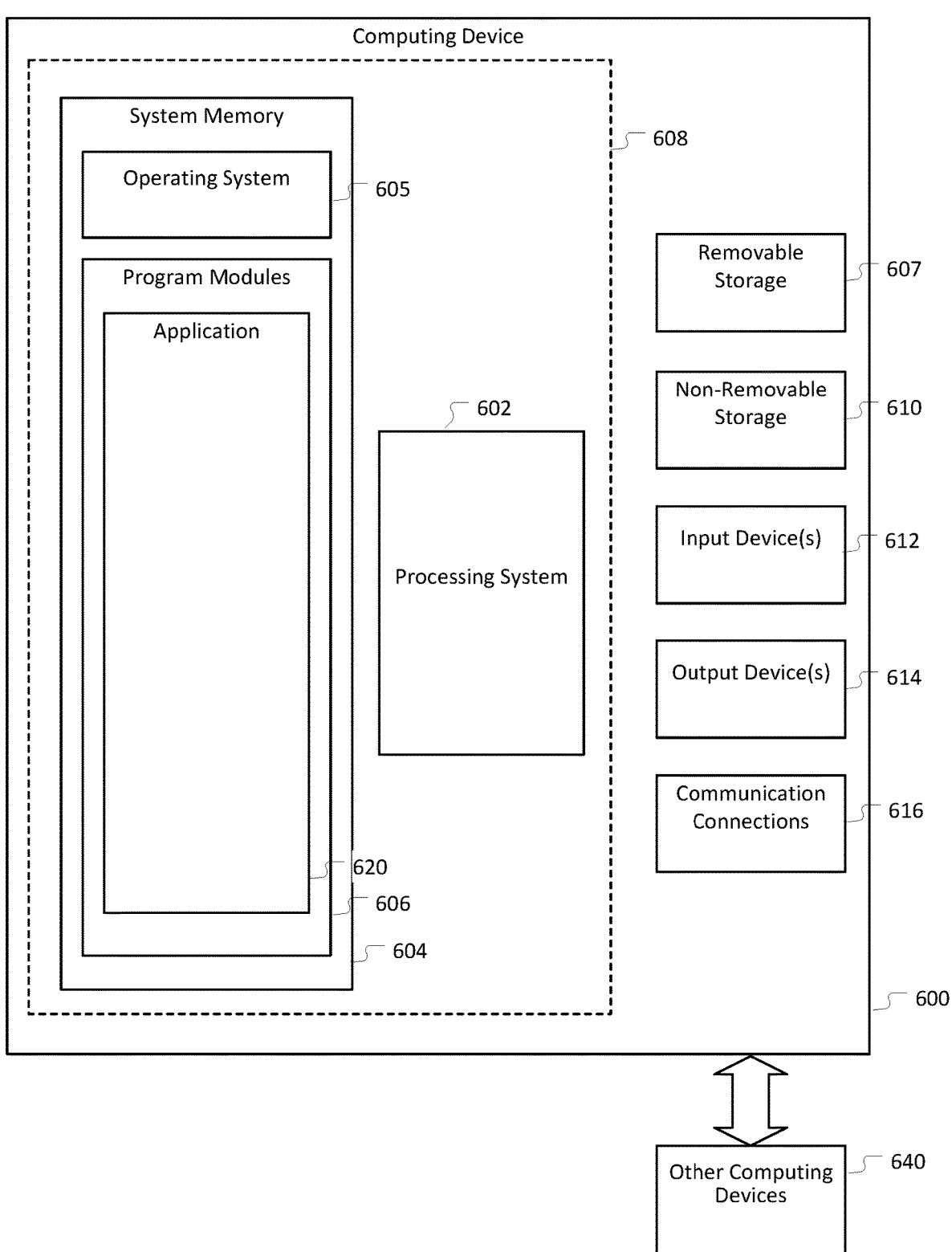
FIG. 6 is a block diagram illustrating example physical components of a computing device for practicing aspects of the disclosure.

FIG. 1 illustrates an overview of an example system 100 for selecting test combinations of hardware and software features for product validation with respect to multiple computing entities. Example system 100 as presented is a combination of interdependent components that interact to form an integrated whole. Components of system 100 include hardware components or software components (e.g., applications, application programming interfaces (APIs), modules, virtual machines, containers, or runtime libraries) implemented on and/or executed by hardware components of system 100. In one example, components of systems disclosed herein are implemented in a computing environment, which may be implemented on a single device or across multiple devices. The computing environment enables software components to execute and utilize resources or facilities of system 100. An example of a computing device comprising such a computing environment is depicted in FIG. 6. In another example, the components of systems disclosed herein are distributed across multiple computing devices. For instance, input may be entered on a user device or client device and information may be processed on or accessed from other devices in a network, such as one or more remote cloud devices or web server devices.

Referring to FIG. 1, the system 100 includes a computing environment 110. The computing environment 110 includes a test scheduler 101 and a data store 102. The test scheduler 101 is a software component that determines test combinations corresponding to computing entities 120 to enable efficient feature validation for computing entities 120. To determine the test combinations, test scheduler 101 dynamically monitors and/or optimizes combinatorial coverage (e.g., the number of combinations covered in testing) and risk coverage (e.g., the amount of risk associated with combinations). In at least one example, risk coverage is calculated by weighted risk by usage. In embodiments, test scheduler 101 uses ML (e.g., reinforcement learning) to dynamically choose combinations. In one or more such embodiments, the test scheduler 101 provides a dashboard visualization that defines success metrics and monitors the effectiveness of the test scheduler 101 (e.g., the effectiveness of current test combinations selected by the test scheduler 101).

The data store 102 stores combinations associated with (e.g., configured for) computing entities 120. In FIG. 1, the data store 102 includes a first combination 130*a*, a second combination 130*b*, a third combination 130*c*, and an n-th combination 130*n*. The computing environment 110 stores or has access to the computing entities 120. In examples, the computing entities 120 include various types of hardware and/or software components, such as servers 120*a* (e.g., clusters of server devices), personal computers (PCs) 120*b*, laptops 120*c*, container instances 120*d*, VM instances 120*n*, and/or the like. The computing entities 120 collectively form, or are included in, a fleet of computing entities. In embodiments, different types of computing entities 120 are associated with the same combinations 130. In some embodiments, different combinations 130 are associated with the same types of computing entities 120. In some examples, one or more of the computing entities 120 may execute in the computing environment 110. For instance, some of the container instances 120*d* and/or VM instances 120*n* may execute in a guest environment provided by a host computing environment 110. In other examples, one or more of the computing entities 120 may be located externally to the computing environment 110. For instance, some of the servers 120*a*, PCs 120*b*, and/or laptops 120*c* may be executed in one or more computing environments accessed remotely by the computing environment 110.

Figure 2:
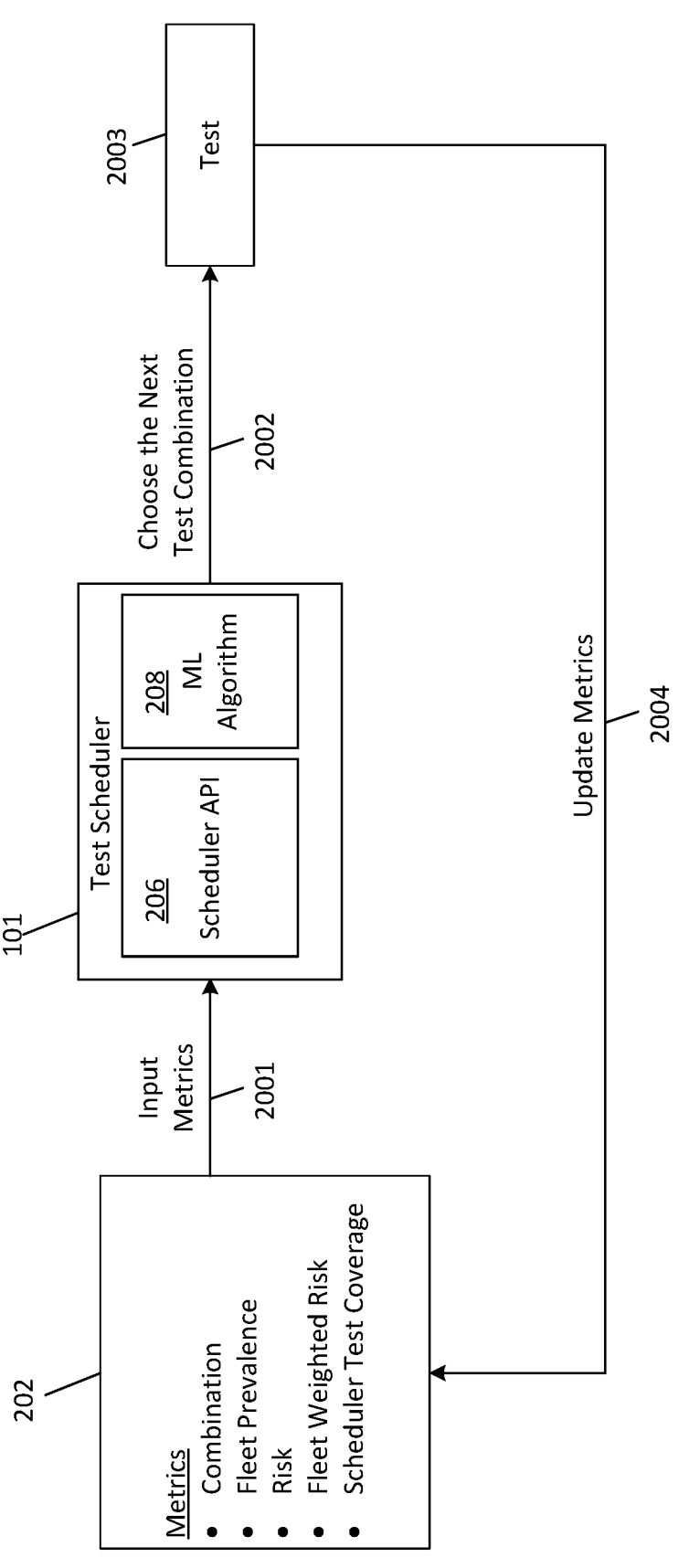
FIG. 2 illustrates an example process flow for selecting test combinations for product validation.

FIG. 2 illustrates an example process flow for selecting test combinations for product validation.

Referring to FIG. 2, the test scheduler 101 receives (operation 2001) metrics 202 to measure the combinatorial coverage for a fleet of computing entities and enable determinations for selecting test combinations that optimize the combinatorial coverage and risk coverage for the fleet. Metrics 202 include combinations (identifies a specific test combination), and may further include fleet prevalence, risk, fleet weighted risk (indicates the fleet risk weighted by the fleet prevalence, e.g., fleet risk*fleet prevalence), and/or scheduler test coverage (indicates a percentage or number of tests that have been dedicated to a combination).

The test scheduler 101 includes a scheduler API 206. The scheduler API 206 provides the metrics 202 to an ML algorithm 208 to determine a batch of test combinations for the test scheduler 101 (operation 2002). In examples, the ML algorithm 208 is a reinforcement learning algorithm, a supervised learning algorithm, or an unsupervised learning. For instance, in some embodiments, ML algorithm 208 is a one-armed (or multi-armed) bandit algorithm or incorporates techniques such as gradient-boosting, regression, or clustering. A one-armed (or multi-armed) bandit algorithm is a statistical learning model used in machine learning to maximize the chances of achieving a desired outcome from multiple options, when little-to-no statistical information is initially known regarding each option's individual capacity to provide the desired outcome, by balancing exploration and exploitation, as discussed below. Gradient-boosting is a machine learning technique used to generate a strong machine-learning model by improving the performance of an initially weak model over a series of iterations. Regression is a machine-learning technique used to estimate output values corresponding to given input values by understanding a relationship between corresponding output and input variables. Clustering is a machine-learning technique used to estimate an output value corresponding to a given input value by determining whether the given input value fits within a group associated with the output values.

The test scheduler 101 executes the batch of test combinations or causes the batch of test combinations to be executed by computing environment 110 (see FIG. 1) (operation 2003). Once the batch of test combinations have been executed (tested), the computing environment 110 updates the metrics 202 based on the results of the testing (operation 2004). The scheduler API 206 then determines a next batch of test combinations to be tested based on the updated metrics 202. Accordingly, the process flow of FIG. 2 is a continuous feedback loop.

In some embodiments, the test scheduler 101 is configured to balance between exploration and exploitation. For example, in some embodiments, a high degree of exploration corresponds to greater combinatorial coverage, which indicates a higher probability of selecting a next test combination at random (e.g., rather than based on existing statistics), which ensures that test combinations that have not yet been selected for testing, but that have a high probability of experiencing issues, are provided an opportunity to be selected for testing. In some examples, a high degree of exploration corresponds to selecting a next test combination based on the next test combination being associated with a relatively low fleet prevalence (e.g., a lower fleet prevalence than a previous test combination). On the other hand, in some examples, a high degree of exploitation corresponds to selecting the next test combination based on the next test combination being associated with greater risk coverage, which indicates a relatively high fleet prevalence and/or a relatively high risk. In some embodiments, a high degree of exploitation corresponds to selecting the next test combination based on the next test combination being associated with the highest fleet prevalence or the highest risk among all the test combinations available. In some examples, a high degree of exploitation corresponds to selecting the next test combination based on the next test combination being associated with a higher fleet prevalence or a higher fleet risk than a previous test combination.

As one example, during an initial phase, the system 100 may not have sufficient data regarding actual risks associated with each test combination. Thus, the test scheduler 101 may initially be configured for a relatively high degree of exploration. However, as more tests are executed, the test scheduler 101 is configured to increasingly exploit the test results to allocate more tests toward test combinations that have a high prevalence and a high risk. In such an example, the weighted risk associated with the test combinations eventually converges to the actual risk observed in the fleet of computing entities.

In some embodiments, the combinatorial coverage of a test scheduler is measured using metrics to create a baseline for a new, optimized test scheduler. A list of such baselining metrics includes a test scheduler coverage score, a fleet weighted sum of risk, a test scheduler weighted sum of risk, and a time to convergence. The test scheduler coverage score is calculated as the correlation coefficient between scheduler test coverage and fleet weighted risk. In some embodiments, the test scheduler coverage score ranges from 0 to 1, where a higher score indicates the test scheduler is prioritizing tests for combinations with a relatively high fleet prevalence and a relatively high risk. The fleet weighted sum of risk is calculated as the sum of fleet weighted risk across all test combinations and represents the overall risk of failure or reliability issues seen in the fleet. The test scheduler weighted sum of risk is calculated as the sum of scheduler weighted risk across all test combinations and represents the overall risk estimated from all test scheduler tests that have been executed. The time to convergence is the time (e.g., based on the number of tests conducted) for the test scheduler weighted sum of risk to converge to the fleet weighted sum of risk. In some embodiments, the time to convergence represents the amount of time that a computing entity should be tested before being deployed (e.g., deployed to a production or test environment).

In some embodiments, some of the metrics discussed above are only available after computing entities have been deployed. To evaluate the effectiveness of an optimized test scheduler, in some embodiments, the scheduling of the optimized test scheduler is simulated on an existing computing entity and compared with the effectiveness of the pre-optimized test scheduler. As a specific example, a graph of the test schedule weighted risk versus the number of tests conducted can be created to identify when the test schedule weighted risk converges toward the fleet weighted risk. For example, such a graph may indicate that the test schedule weighted risk converges towards the fleet weighted risk after a certain number of simulated tests (e.g., after 90,000 simulated tests).

Figure 3:
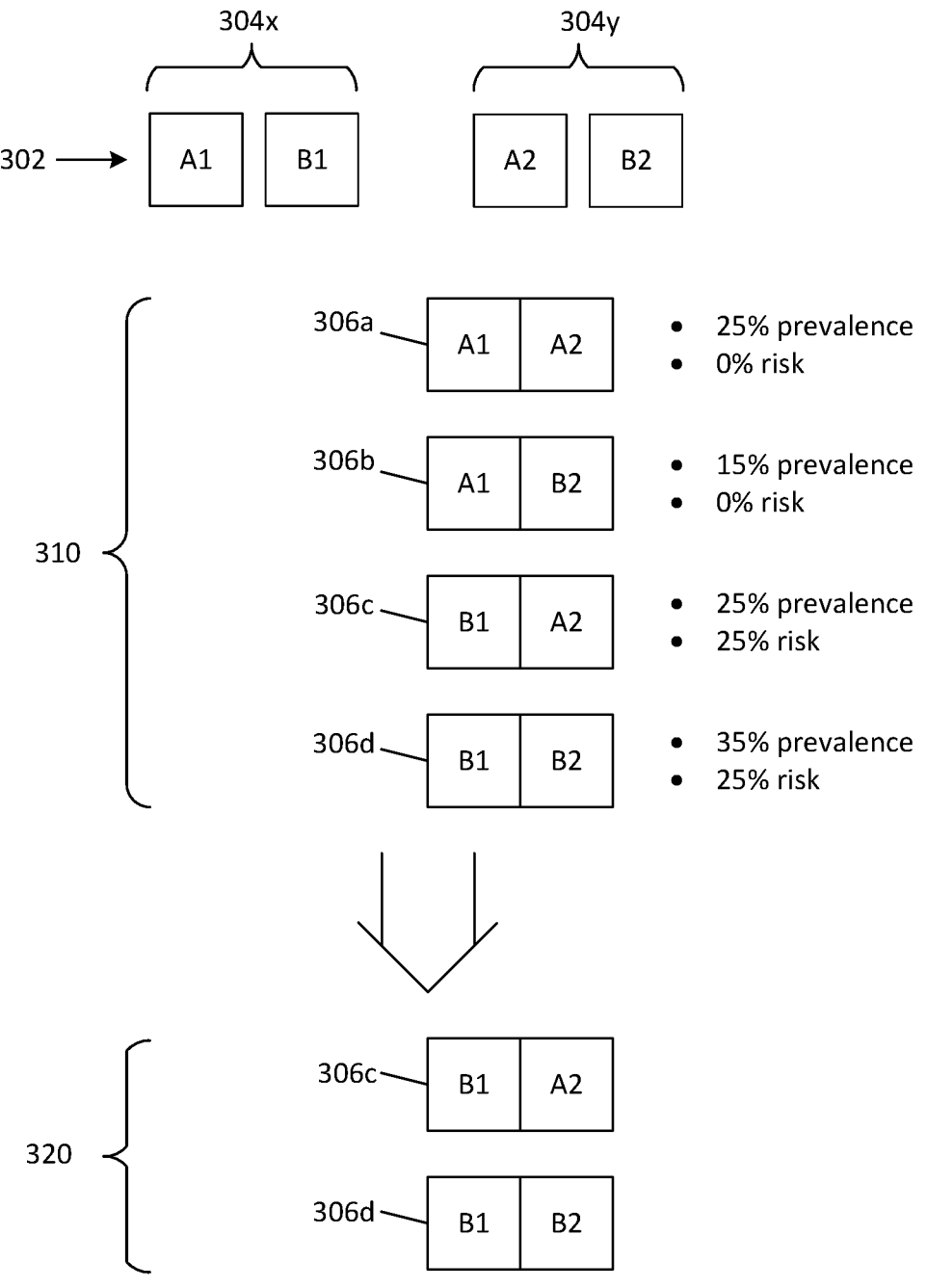
FIG. 3 illustrates an example process flow for selecting a batch of test combinations for multiple computing entities based on a fleet prevalence and a risk for the multiple computing entities.

FIG. 3 illustrates an example process flow for selecting a batch of test combinations for multiple computing entities based on a fleet prevalence and a risk for the multiple computing entities.

Referring to FIG. 3, a test combination 306 corresponds to a grouping of features 302 shared by multiple computing entities 120 (see FIG. 1). The features 302 are associated with attributes 304 (individually referred to as 304$x$ and 304$y$) that distinguish one test combination 306 (e.g., any one of test combinations 306$a$-$d$) from another test combination 306 (e.g., another one of test combinations 306$a$-$d$). In other words, a test combination 306 (e.g., any one of test combinations 306$a$-$d$) is a set of features 302 that is associated with a group of computing entities 120 having similar attributes 304. The attributes 304 and features 302 associated with a test combination 306 may be domain specific, such that different computing entities 120 use different types of features 302 to define test combinations 306.

In one example, the test scheduler 101 (see FIG. 1) chooses batches of test combinations 306 based on features 302 corresponding to two attributes 304. A first attribute

304$x$ corresponds to a type of hardware model, such as hardware model A1 or hardware model B1. A second attribute 304$y$ corresponds to a VM size, such as size A2 or size B2.

The test scheduler 101 identifies a fleet prevalence, a risk, and/or other metrics (e.g., a weighted fleet risk, test coverage percentages for test combinations, or historical failure data for deployed computing entities) associated with different test combinations 306$a$-$d$ in a first batch of test combinations 310. In FIG. 3, the test scheduler 101 identifies that 0% of computing entities 120 including hardware model A1 (i.e., test combinations 306$a$ and 306$b$) have failed during testing (and/or when deployed), while 50% of computing entities 120 including hardware model B1 (i.e., test combinations 306$c$ and 306$d$) have failed during testing (and/or when deployed). Accordingly, the test scheduler 101 determines that the test combinations 306$c$ and 306$d$ have a higher risk than the test combinations 306$a$ and 306$b$. Additionally, the test scheduler 101 determines that the computing entities 120 including hardware model B1 correspond to 60% of the fleet (i.e., 25% prevalence for test combination 306$c$+35% prevalence for test combination 306$d$), while the computing entities 120 including hardware model A1 correspond to 40% of the fleet (i.e., 25% prevalence for test combination 306$a$+15% prevalence for test combination 306$b$. Accordingly, the test scheduler 101 determines that test combinations 306$c$ and 306$d$ have a higher fleet prevalence than the test combinations 306$a$ and 306$b$.

Based on the fleet prevalence and the estimated risk (e.g., from tests, fleet risk information), the test scheduler 101 determines (e.g., chooses) a second batch of test combinations 320 including only test combinations 306$c$ and 306$d$. The second batch of test combinations 320 corresponds to the computing entities 120 that are most likely to fail during testing or deployment. In some embodiments, the first batch of test combinations 310 includes test combinations to cover all of the computing entities in the fleet, while the second batch of test combinations 320 includes combinations covering less than all of the computing entities in the fleet.

FIG. 4 illustrates an example batch of combinations. The batch of combinations 410 may represent test combinations to be tested or a set of potential test combinations from which a test combination to be tested is selected. For example, the test scheduler 101 uses ML techniques to dynamically choose combinations that optimize the combinatorial coverage and/or the risk coverage for a fleet of computing entities associated with batch of combinations 410. The batch of combinations 410 is depicted in table format with each row defining one test combination for a group of VMs and each column defining an attribute of the group of VMs.

Referring to FIG. 4, five attributes 401-405 are used to define the batch of combinations 410. A first attribute 401 indicates a generation of hardware associated with the VM, a second attribute 402 indicates a VM family name, a third attribute 403 indicates whether a first specific feature is enabled on the VM (e.g., whether an Accelerated Network (AN) is enabled on the VM), a fourth attribute 404 indicates whether a second specific feature is enabled on the VM (e.g., whether Remote Direct Memory Access (RDMA) features are enabled on the VM), and a fifth attribute 405 indicates whether a third specific feature is enabled on the VM (e.g., whether a type of storage resource is associated with the VM). Each row of the table defines one of test combinations 306$a$-$g$ and represents a group of VMs. For example, the first row corresponds to a test combination 306$a$ indicating the following features: (i) a hardware generation 6.0; (ii) a VM family of standardDv3Family; (iii) AN is not enabled; (iv) RDMA is not enabled; and (v) fast solid-state drive (SSD) is not enabled.

FIG. 5 illustrates an example method for selecting test combinations for product validation. In some examples, a method 5000 for selecting test combinations for product validation includes one or more of the following operations. A test scheduler 101 running on a computing environment 110 (see FIG. 1) receives metrics 202 (see FIG. 2) associated with a fleet of computing entities 120 (see FIG. 1). In some examples, the computing entities 120 include or are associated with a first batch of test combinations 310 (see FIG. 3), and the metrics 202 received by the test scheduler 101 are associated with the first batch of test combinations 310. In other examples, the computing entities 120 include or are associated with a first batch of combinations 130 (see FIG. 1), and the metrics 202 received by the test scheduler 101 are associated with the first batch of combinations 130 (e.g., test combinations and non-test combinations). The metrics comprise data associated with a first fleet prevalence, a first estimated risk from tests (or a first fleet risk), and/or other metrics determined for the multiple computing entities (operation 5001). The test scheduler 101 provides the metrics to a ML algorithm 208 (see FIG. 2) (operation 5002). The test scheduler 101 determines a second batch of test combinations 320 (see FIG. 3) associated with a subset of the multiple computing entities 120 based on an output of the ML algorithm 208. The second batch of test combinations 320 includes a subset of the first batch of test combinations 310 (operation 5003). The computing environment 110 executes the second batch of test combinations 320 for the subset of the multiple computing entities (operation 5004).

FIG. 6 is a block diagram illustrating example physical components (e.g., hardware) of a computing device 600 with which aspects of the disclosure may be practiced. FIG. 6 and the associated description provides a discussion of an operating environment in which aspects of the disclosure may be practiced. However, the systems illustrated and discussed with respect to FIG. 6 are for purposes of example and illustration, and, as is understood, a vast number of computing device configurations may be utilized for practicing aspects of the disclosure, described herein.

The computing device components described below may be suitable for the computing devices and systems described above. In a basic configuration, the computing device 600 includes a processing system 602 comprising at least one processing unit and a system memory 604. Depending on the configuration and type of computing device, the system memory 604 may comprise volatile storage (e.g., random access memory), non-volatile storage (e.g., read-only memory), flash memory, or any combination of such memories.

The system memory 604 includes an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may include additional data storage devices (removable and/or non-removable) such as, for example, magnetic disks, optical disks, tape, and other computer readable media. Such additional storage is illustrated in FIG. 6 by a removable storage device 607 and a non-removable storage device 610.

The term computer readable media as used herein includes computer storage media. Computer storage media includes volatile and nonvolatile, removable and non-removable media implemented in any method or technology for storage of information, such as computer readable instructions, data structures, or program modules. The system memory 604, the removable storage device 607, and the non-removable storage device 610 are all computer storage media examples (e.g., memory storage). Computer storage media may include random access memory (RAM), read-only memory (ROM), electrically erasable ROM (EE-PROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As stated above, a number of program modules and data files may be stored in the system memory 604. While executing on the processing system 602, the program modules 606 (e.g., software application 620) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. Output device(s) 614 such as a display, speakers, a printer, etc. may also be included. The aforementioned devices are examples and others may be used. The computing device 600 may include one or more communication connections 616 allowing communications with other computing devices 640. Examples of suitable communication connections 616 include radio frequency (RF) transmitter, receiver, and/or transceiver circuitry; universal serial bus (USB), parallel, and/or serial ports.

As will be understood from the foregoing disclosure, one example of the technology relates to a method comprising: receiving, by a test scheduler, one or more first metrics associated with a first batch of test combinations for multiple computing entities, the one or more first metrics comprising data associated with a first fleet prevalence and a first risk determined for the multiple computing entities; providing the one or more first metrics to a machine learning algorithm trained to determine an impact of one or more features of the multiple computing entities on a performance of the multiple computing entities; determining, by the test scheduler, a second batch of test combinations associated with a subset of the multiple computing entities based on an output of the machine learning algorithm, the second batch of test combinations including a subset of the first batch of test combinations; and executing the second batch of test combinations for the subset of the multiple computing entities.

In another example, the technology relates to a system comprising: a processing system; and memory coupled to the processing system, the memory comprising computer executable instructions that, when executed by the processing system, perform a method. The method comprises: receiving, by a test scheduler, one or more first metrics associated with a first batch of test combinations for multiple computing entities, the one or more first metrics comprising data associated with a first fleet prevalence and a first risk determined for the multiple computing entities; providing the one or more first metrics to a machine learning algorithm trained to determine an impact of one or more features of the multiple computing entities on a performance of the multiple computing entities; determining, by the test scheduler, a second batch of test combinations associated with a subset of the multiple computing entities based on an output of the machine learning algorithm, the second batch of test combinations including a subset of the first batch of test combinations; and executing the second batch of test combinations for the subset of the multiple computing entities.

In another example, the technology relates to a computer storage medium implemented on a device, the computer storage medium having computer code that, when executed on a processor, implements a method. The method comprises: receiving, by a test scheduler, one or more first metrics associated with a first batch of test combinations for multiple computing entities, the one or more first metrics comprising data associated with a first fleet prevalence and a first risk determined for the multiple computing entities; providing the one or more first metrics to a machine learning algorithm trained to determine an impact of one or more features of the multiple computing entities on a performance of the multiple computing entities; determining, by the test scheduler, a second batch of test combinations associated with a subset of the multiple computing entities based on an output of the machine learning algorithm, the second batch of test combinations including a subset of the first batch of test combinations; and executing the second batch of test combinations for the subset of the multiple computing entities.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:
   receiving first metrics associated with a first batch of test combinations for multiple computing entities, the first metrics comprising:
      data associated with a first fleet prevalence and a first risk determined for the multiple computing entities; and
      a parameter indicating a degree of exploration versus a degree of exploitation for selecting a next test combination, wherein increasing the degree of exploration corresponds to increasing a probability of selecting the next test combination at random and increasing the degree of exploitation corresponds to increasing a probability the next test combination is selected based on at least one of a higher fleet prevalence or a higher risk than a previous test combination;
   providing the first metrics to a machine learning algorithm trained to determine an impact of features of the multiple computing entities on a performance of the multiple computing entities;
   determining a second batch of test combinations associated with a subset of the multiple computing entities based on an output of the machine learning algorithm, the second batch of test combinations including a subset of the first batch of test combinations; and
   executing the second batch of test combinations for the subset of the multiple computing entities.

2. The method of claim 1, further comprising determining second metrics associated with the second batch of test combinations, the second metrics comprising data associated with a second fleet prevalence and a second risk determined for the subset of the multiple computing entities based on executing the second batch of test combinations.

3. The method of claim 2, further comprising a feedback loop for improving a combinatorial coverage of test combinations.

4. The method of claim 1, wherein:
the multiple computing entities comprise a node, a virtual machine, or a container; and
a first computing entity of the multiple computing entities comprises a different combination of features than a second computing entity of the multiple computing entities.

5. The method of claim 1, wherein the machine learning algorithm comprises reinforcement learning.

6. The method of claim 1, further comprising:
determining an effectiveness of the second batch of test combinations based on a coverage score indicating a degree to which test combinations are being selected to prioritize higher fleet prevalence and higher risk.

7. The method of claim 1, wherein a combination of the first batch of test combinations comprise at least one of:
hardware model;
software version; or
computing resources.

8. A system comprising:
a processing system; and
memory coupled to the processing system, the memory comprising computer executable instructions that, when executed by the processing system, perform operations comprising:
receiving first metrics associated with a first batch of test combinations for multiple computing entities, the first metrics comprising:
data associated with a first fleet prevalence and a first risk determined for the multiple computing entities; and
a parameter indicating a degree of exploration versus a degree of exploitation for selecting a next test combination, wherein increasing the degree of exploration corresponds to increasing a probability of selecting the next test combination at random and increasing the degree of exploitation corresponds to increasing a probability the next test combination is selected based on at least one of a higher fleet prevalence or a higher risk than a previous test combination;
providing the first metrics to a machine learning algorithm trained to determine an impact of features of the multiple computing entities on a performance of the multiple computing entities;
determining a second batch of test combinations associated with a subset of the multiple computing entities based on an output of the machine learning algorithm, the second batch of test combinations including a subset of the first batch of test combinations; and
executing the second batch of test combinations for the subset of the multiple computing entities.

9. The system of claim 8, wherein the operations further comprise determining second metrics associated with the second batch of test combinations, the second metrics comprising data associated with a second fleet prevalence and a second risk determined for the subset of the multiple computing entities based on executing the second batch of test combinations.

10. The system of claim 9, wherein the operations correspond to a feedback loop for improving a combinatorial coverage of test combinations.

11. The system of claim 8, wherein:
the multiple computing entities comprise a node, a virtual machine, or a container; and
a first computing entity of the multiple computing entities comprises a different combination of features than a second computing entity of the multiple computing entities.

12. The system of claim 8, wherein the machine learning algorithm comprises reinforcement learning.

13. The system of claim 8, wherein the operations further comprise determining an effectiveness of the second batch of test combinations based on a coverage score indicating a degree to which test combinations are being selected to prioritize higher fleet prevalence and higher risk.

14. The system of claim 8, wherein a combination of the first batch of test combinations comprise at least one of:
computing entity size;
networking options; or
data storage options.

15. A computer storage medium implemented on a device, the computer storage medium having computer code that, when executed on a processor, implements a method comprising:
receiving first metrics associated with a first batch of test combinations for multiple computing entities, the first metrics comprising:
data associated with a first fleet prevalence and a first risk determined for the multiple computing entities; and
a parameter indicating a degree of exploration versus a degree of exploitation for selecting a next test combination, wherein increasing the degree of exploration corresponds to increasing a probability of selecting the next test combination at random and increasing the degree of exploitation corresponds to increasing a probability the next test combination is selected based on at least one of a higher fleet prevalence or a higher risk than a previous test combination;
providing the first metrics to a machine learning algorithm trained to determine an impact of features of the multiple computing entities on a performance of the multiple computing entities;
determining a second batch of test combinations associated with a subset of the multiple computing entities based on an output of the machine learning algorithm, the second batch of test combinations including a subset of the first batch of test combinations; and
executing the second batch of test combinations for the subset of the multiple computing entities.

16. The computer storage medium of claim 15, wherein the method further comprises determining second metrics associated with the second batch of test combinations, the second metrics comprising data associated with a second fleet prevalence and a second risk determined for the subset of the multiple computing entities based on executing the second batch of test combinations.

17. The computer storage medium of claim 16, wherein the method further comprises a feedback loop for improving a combinatorial coverage of test combinations.

18. The computer storage medium of claim 15, wherein:
the multiple computing entities comprise a node, a virtual machine, or a container; and a first computing entity of the multiple computing entities comprises a different combination of features than a second computing entity of the multiple computing entities.

19. The computer storage medium of claim 15, wherein the machine learning algorithm comprises reinforcement learning.

20. The computer storage medium of claim 15, wherein a combination of the first batch of test combinations comprise at least one of:

user access options;
    security options; or
    usage options.

* * * * *